(12) United States Patent
Kitago et al.

(10) Patent No.: US 10,280,286 B2
(45) Date of Patent: May 7, 2019

(54) RUBBER COMPOSITION MANUFACTURING METHOD AND PNEUMATIC TIRE

(71) Applicant: SUMITOMO RUBBER INDUSTRIES, LTD., Kobe-shi (JP)

(72) Inventors: Ryota Kitago, Kobe (JP); Yasumasa Bito, Kobe (JP); Ryuichi Tokimune, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 15/482,848

(22) Filed: Apr. 10, 2017

(65) Prior Publication Data

US 2017/0292007 A1  Oct. 12, 2017

(30) Foreign Application Priority Data

Apr. 11, 2016 (JP) ................. 2016-079036

(51) Int. Cl.
| | | |
|---|---|---|
| *B29B 7/00* | (2006.01) | |
| *B29B 7/18* | (2006.01) | |
| *B29B 7/74* | (2006.01) | |
| *B29B 7/90* | (2006.01) | |
| *B60C 1/00* | (2006.01) | |
| *C08J 3/20* | (2006.01) | |
| *C08J 3/24* | (2006.01) | |
| *C08K 3/36* | (2006.01) | |
| *C08K 5/3417* | (2006.01) | |
| *C08K 5/3435* | (2006.01) | |
| *C08K 5/548* | (2006.01) | |
| *B29K 9/06* | (2006.01) | |
| *B29K 509/00* | (2006.01) | |
| *B29L 30/00* | (2006.01) | |

(52) U.S. Cl.
CPC ............ *C08K 5/3417* (2013.01); *B29B 7/002* (2013.01); *B29B 7/005* (2013.01); *B29B 7/7495* (2013.01); *B29B 7/90* (2013.01); *B60C 1/00* (2013.01); *C08J 3/201* (2013.01); *C08J 3/203* (2013.01); *C08J 3/24* (2013.01); *C08K 3/36* (2013.01); *C08K 5/3435* (2013.01); *C08K 5/548* (2013.01); *B29B 7/183* (2013.01); *B29K 2009/06* (2013.01); *B29K 2509/00* (2013.01); *B29L 2030/00* (2013.01); *C08J 2309/06* (2013.01); *C08J 2321/00* (2013.01)

(58) Field of Classification Search
CPC ...... C08K 3/36; C08K 5/3417; C08K 5/3435; C08K 5/548; C08J 3/24; C08J 2309/06; C08J 3/201; C08J 3/203; C08J 2321/00; B29B 7/002; B29B 7/005; B29B 7/7495; B29B 7/90; B29B 7/183; B29K 2009/06; B29K 2509/00; B29L 2030/00; B60C 1/00

See application file for complete search history.

(56) References Cited

U.S. PATENT DOCUMENTS

| | | | | |
|---|---|---|---|---|
| 3,838,114 A | * | 9/1974 | Lawrence ............ | C07D 209/48 525/348 |
| 2003/0199619 A1 | * | 10/2003 | Cruse ................. | B60C 1/00 524/261 |
| 2012/0067495 A1 | * | 3/2012 | Hahn ................. | B60C 1/00 152/541 |

FOREIGN PATENT DOCUMENTS

JP   2002-363346 A   12/2002

* cited by examiner

*Primary Examiner* — Patrick D Niland
(74) *Attorney, Agent, or Firm* — Oblon, McClelland, Maier & Neustadt, L.L.P.

(57) ABSTRACT

A method for manufacturing a rubber composition includes kneading a rubber component, an inorganic filler and a thioester-based silane coupling agent, and adding a vulcanizing agent and one or more compounds selected from the group of an imide compound and an N-oxyl compound to a mixture of the rubber component, the inorganic filler, and the thioester-based silane coupling agent such that the vulcanizing agent and the imide compound and/or the N-oxyl compound are kneaded with the mixture including the rubber component, the inorganic filler, and the thioester-based silane coupling agent.

20 Claims, No Drawings

RUBBER COMPOSITION MANUFACTURING METHOD AND PNEUMATIC TIRE

CROSS-REFERENCE TO RELATED APPLICATIONS

The present application is based upon and claims the benefit of priority to Japanese Patent Application No. 2016-079036, filed Apr. 11, 2016, the entire contents of which are incorporated herein by reference.

BACKGROUND OF THE INVENTION

Field of the Invention

The present invention relates to a rubber composition manufacturing method and a pneumatic tire that uses a rubber composition obtained by using the manufacturing method.

Description of Background Art

Japanese Patent Laid-Open Publication No. 2002-363346 describes a rubber composition manufacturing method. The entire contents of this publication are incorporated herein by reference.

SUMMARY OF THE INVENTION

According to one aspect of the present invention, a method for manufacturing a rubber composition includes kneading a rubber component, an inorganic filler and a thioester-based silane coupling agent, and adding a vulcanizing agent and one or more compounds selected from the group of an imide compound and an N-oxyl compound to a mixture of the rubber component, the inorganic filler, and the thioester-based silane coupling agent such that the vulcanizing agent and the imide compound and/or the N-oxyl compound are kneaded with the mixture including the rubber component, the inorganic filler, and the thioester-based silane coupling agent.

DETAILED DESCRIPTION OF THE EMBODIMENTS

The embodiments will now be described.

A manufacturing method according to an embodiment of the present invention includes a base kneading process in which a rubber component, an inorganic filler and a thioester-based silane coupling agent are kneaded, and a finishing kneading process in which a vulcanizing agent and at least one compound selected from a group consisting of an imide compound and an N-oxyl compound are kneaded.

As a silane coupling agent, a disulfide-based silane coupling agent having an S—S bond, a thioester-based silane coupling agent having an S—C bond, or the like is used. The disulfide-based silane coupling agent has an advantage that the S—S bond is easily broken and an amount of bonding with a polymer is increased, but also has a disadvantage that, since the S—S bond breaks also during kneading, a gel is formed during kneading, and processability deteriorates. The thioester-based silane coupling agent has an advantage that, since the S—C bond is difficult to break, a gel is unlikely to form during kneading and processability is good, but also has a disadvantage that, since the S—C bond is difficult to break even during vulcanization, an amount of bonding with a polymer is low even in a vulcanized rubber and an elastic modulus decreases.

A manufacturing method according to an embodiment of the present invention can solve the above problem by kneading a thioester-based silane coupling agent in a base kneading process and kneading an imide compound or an N-oxyl compound in a finishing kneading process. It is thought that this is an operation effect obtained by that, by using a thioester-based silane coupling agent, reactivity of the silane coupling agent is kept low during the base kneading process and good processability is obtained, and at the same time, by adding an imide compound or an N-oxyl compound in the finishing kneading process, during vulcanization, the imide compound or the N-oxyl compound promotes breaking of the S—C bond of the thioester-based silane coupling agent and an amount of bonding between the thioester-based coupling agent and a polymer after vulcanization is increased. Therefore, by using a manufacturing method according to an embodiment of the present invention, good processability of the thioester-based silane coupling agent is obtained, and at the same time, the reactivity of the thioester-based silane coupling agent is controlled by the imide compound or the N-oxyl compound. As a result, a rubber composition for which various performances such as processability, wear resistance and steering stability are improved in a well-balanced manner can be manufactured.

First, with respect to a manufacturing method according to an embodiment of the present invention, components to be used are described.

Rubber Component

A rubber component that can be used in an embodiment of the present invention is not particularly limited. For example, diene-based rubbers such as natural rubber (NR), epoxidized natural rubber (ENR), isoprene rubber (IR), butadiene rubber (BR), styrene butadiene rubber (SBR), styrene isoprene butadiene rubber (SIBR) can be used. These rubber components may each be independently used, or two or more of these rubber components may be used in combination. Among these, for a reason that good wear resistance, steering stability and processability can be obtained in a well-balanced manner, SBR, NR and BR are preferable, and SBR is more preferable.

As SBR, emulsion-polymerized styrene butadiene rubber (E-SBR), solution-polymerized styrene butadiene rubber (S—SBR) and the like can be used. Among these, the S—SBR is preferable.

From a point of view of an effect according to an embodiment of the present invention, vinyl content (an amount of constituent units of vinyl bonds in 100% by mass of constituent units based on butadiene) of SBR is preferably 20-90% by mass, and more preferably 40-70% by mass; and styrene content of SBR is preferably 5-60% by mass, and more preferably 10-30% by mass. The vinyl content and the styrene content of SBR can be measured by $^1$H-NMR measurement.

For a reason that good wear resistance, steering stability and processability can be obtained in a well-balanced manner, in a rubber composition obtained by using a manufacturing method according to an embodiment of the present invention, SBR content in 100% by mass of a rubber component is preferably 50% by mass or more, and more preferably 70% by mass or more, and may be 100% by mass.

Inorganic Filler

As an inorganic filler, white fillers such as silica, clay, alumina, talc, calcium carbonate, magnesium carbonate, aluminum hydroxide, magnesium hydroxide, magnesium oxide, titanium oxide, and the like, can be used. These inorganic fillers may each be independently used, or two or more of these inorganic fillers may be used in combination. Among these, for a reason that good wear resistance, steering stability and processability can be obtained in a well-balanced manner, silica, clay, aluminum hydroxide and alumina are preferable, and silica is particularly preferable.

As the silica, for example, dry silica (anhydrous silicic acid), wet silica (hydrous silicic acid) and the like can be used. However, for a reason of having a large amount of silanol groups, the wet silica is preferable.

A nitrogen adsorption specific surface area ($N_2SA$) of the silica is preferably 50 $m^2/g$ or more, and more preferably 100 $m^2/g$ or more. When the $N_2SA$ of the silica is less than 50 $m^2/g$, there is a risk that sufficient wear resistance cannot be obtained. Further, the $N_2SA$ of the silica is preferably 220 $m^2/g$ or less, and more preferably 200 $m^2/g$ or less. When the $N_2SA$ of the silica exceeds 220 $m^2/g$, dispersion into the rubber becomes difficult, and there is a risk that a dispersion defect may occur.

The nitrogen adsorption specific surface area of the silica is a value measured by using the BET method in accordance with ASTM D3037-81.

In a rubber composition obtained by using a manufacturing method according to an embodiment of the present invention, content of an inorganic filler, with respect to 100 parts by mass of a rubber component, is preferably 40 parts by mass or more, and more preferably 60 parts by mass or more. When the content of the inorganic filler is less than 40 parts by mass, there is a risk that sufficient low fuel consumption performance cannot be obtained. Further, the content of the inorganic filler is preferably 150 parts by mass or less, and more preferably 100 parts by mass or less. When the content of the inorganic filler exceeds 150 parts by mass, dispersion into the rubber becomes difficult, and there is a risk that a dispersion defect may occur. When silica is used as the inorganic filler, it is preferable to adjust content of the silica to the same range.

Thioester-Based Silane Coupling Agent

A thioester-based silane coupling agent is an S—C bond containing silane coupling agent having a coupling ability between a rubber component and silica. Among thioester-based silane coupling agents, for a reason that the effect according to an embodiment of the present invention can be satisfactorily obtained, a thioester-based silane coupling agent represented by the following formula (S1) can be suitably used:

Chemical Formula 9

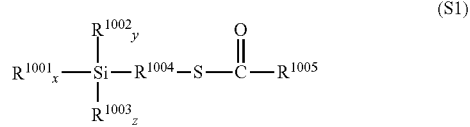

(S1)

where $R^{1001}$ is a monovalent group selected from —Cl, —Br, —$OR^{1006}$, —O (O=) $CR^{1006}$, —ON=$CR^{1006}R^{1007}$, —ON=$CR^{1006}R^{1007}$, —$NR^{1006}R^{1007}$ and —$(OSiR^{1006}R^{1007})_h(OSiR^{1006}R^{1007}R^{1008})$ (where $R^{1006}$, $R^{1007}$ and $R^{1008}$ may be the same or different and are each a hydrogen atom or a monovalent hydrocarbon group having 1-18 carbon atoms; and h has an average value of 1-4); $R^{1002}$ is $R^{1001}$, a hydrogen atom or a monovalent hydrocarbon group having 1-18 carbon atoms; $R^{1003}$ is $R^{1001}$, $R^{1002}$, a hydrogen atom or a —$[O(R^{1009}O)_j]_{0.5}$— group (where $R^{1009}$ is an alkylene group having 1-18 carbon atoms; and j is an integer of 1-4); $R^{1004}$ is a divalent hydrocarbon group having 1-18 carbon atoms; $R^{1005}$ is a monovalent hydrocarbon group having 1-18 carbon atoms; and x, y and z are numbers satisfying the relations: x+y+2z=3, 0≤x≤3, 0≤y≤2, 0≤z≤1.

In the above formula (S1), $R^{1005}$, $R^{1006}$, $R^{1007}$ and $R^{1008}$ are preferably each independently a group selected from a group consisting of linear, cyclic or branched alkyl group, alkenyl group, aryl group and aralkyl group having 1-18 carbon atoms. Further, when $R^{1002}$ is a monovalent hydrocarbon group having 1-18 carbon atoms, $R^{1002}$ is preferably a group selected from a group consisting of linear, cyclic or branched alkyl group, alkenyl group, aryl group and aralkyl group. $R^{1009}$ is preferable a linear, cyclic or branched alkylene group, and particularly preferably a linear alkylene group. $R^{1004}$ is, for example, an alkylene group having 1-18 carbon atoms, an alkenylene group having 2-18 carbon atoms, a cycloalkylene group having 5-18 carbon atoms, a cycloalkylalkylene group having 6-18 carbon atoms, an arylene group having 6-18 carbon atoms, or an aralkylene group having 7-18 carbon atoms. The alkylene group and the alkenylene group may each be linear or branched. The cycloalkylene group, the cycloalkylalkylene group, the arylene group and the aralkylene group may each have a functional group such as lower alkyl group on a ring. As $R^{1004}$, an alkylene group having 1-6 carbon atoms is preferable, and in particular, a linear alkylene group, for example, a methylene group, an ethylene group, a trimethylene group, a tetramethylene group, a pentamethylene group, or a hexamethylene group is preferable.

Specific examples of $R^{1002}$, $R^{1005}$, $R^{1006}$, $R^{1007}$ and $R^{1008}$ in the above formula (S1) include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, an xylyl group, a naphthyl group, a benzyl group, a phenethyl group, a naphthylmethyl group, and the like.

Examples of $R^{1009}$ in the above formula (S1) include linear alkylene groups such as a methylene group, an ethylene group, an n-propylene group, an n-butylene group and a hexylene group, and branched alkylene groups such as an isopropylene group, an isobutylene group and a 2-methylpropylene group.

Specific examples of the thioester-based silane coupling agent represented by the above formula (S1) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroyl thioethyl triethoxy silane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, and the like. Among these, for a reason that good wear resistance, steering stability and processability can be obtained in a well-balanced manner, 3-octanoylthiopropyltriethoxysilane (NXT silane manufactured by Momentive Performance Materials Corporation) is particularly preferable. These thioester-based silane coupling agents may each be independently used, or two or more of these thioester-based silane coupling agents may be used in combination.

In a rubber composition obtained by using a manufacturing method according to an embodiment of the present invention, content of a thioester-based silane coupling agent, with respect to 100 parts by mass of an inorganic filler, is preferably 1 part by mass or more, more preferably 3 parts by mass or more, and even more preferably 4 parts by mass or more. When the content of the thioester-based silane coupling agent is less than 1 part by mass, there is a tendency that an improvement effect of wear resistance and steering stability cannot be sufficiently obtained. Further, the content of the thioester-based silane coupling agent is preferably 20 parts by mass or less, more preferably 15 parts by mass or less, and even more preferably 12 parts by mass or less. When the content of the thioester-based silane coupling agent exceeds 20 parts by mass, there is a risk that processability may deteriorate. When silica is used as the inorganic filler, it is preferable to adjust the content of the thioester-based silane coupling agent to the same range with respect to silica.

Carbon Black

In an embodiment of the present invention, it is preferable to use carbon black. Examples of the carbon black include GPF, FEF, HAF, ISAF, SAF and the like.

A nitrogen adsorption specific surface area ($N_2SA$) of the carbon black is preferably 80 $m^2/g$ or more, and more preferably 100 $m^2/g$ or more. When the $N_2SA$ of the carbon black is less than 80 $m^2/g$, a reinforcing property deteriorates, and there is a tendency that sufficient steering stability and wear resistance cannot be obtained. Further, the $N_2SA$ of the carbon black is preferably 300 $m^2/g$ or less, more preferably 180 $m^2/g$ or less, and even more preferably 130 $m^2/g$ or less. When the $N_2SA$ of the carbon black exceeds 300 $m^2/g$, low fuel consumption performance and processability tend to deteriorate.

Dibutyl phthalate oil absorption (DBP) of the carbon black is preferably 60 ml/100 g or more, more preferably 80 ml/100 g or more, and even more preferably 100 ml/100 g or more. When the DBP of the carbon black is less than 60 ml/100 g, a reinforcing property deteriorates, and there is a tendency that sufficient steering stability and wear resistance cannot be obtained. Further, the DBP of the carbon black is preferably 300 ml/100 g or less, more preferably 200 ml/100 g or less, and even more preferably 140 ml/100 g or less. When the DBP of the carbon black exceeds 300 ml/100 g, low fuel consumption performance and processability tend to deteriorate.

In a rubber composition obtained by using a manufacturing method according to an embodiment of the present invention, content of carbon black, with respect to 100 parts by mass of a rubber component, is preferably 1 part by mass or more, and more preferably 3 parts by mass or more. When the content of carbon black is less than 1 part by mass, a sufficient reinforcing property cannot be obtained, and steering stability and wear resistance tend to deteriorate. Further, the content of the carbon black is preferably 50 parts by mass or less, more preferably 20 parts by mass or less, and even more preferably 10 parts by mass or less. When the content of the carbon black exceeds 50 parts by mass, there is a risk that low fuel consumption performance and processability may deteriorate.

Vulcanizing Agent

As a vulcanizing agent, a material such as sulfur can be used. Sulfur is not particularly limited, and those used in the tire industry can be used. However, powdered sulfur is preferable.

For a reason that good wear resistance, steering stability and processability can be obtained in a well-balanced manner, in a rubber composition obtained by using a manufacturing method according to an embodiment of the present invention, content of sulfur, with respect to 100 parts by mass of a rubber component, is preferably 0.1 parts by mass or more and 6 parts by mass or less, and more preferably 0.5 parts by mass or more and 4 parts by mass or less.

Imide Compound

In an embodiment of the present invention, an imide compound is a compound having an imide group (a group represented by CO—N—CO: a group obtained by removing a hydrogen atom on a nitrogen atom of an imide unit from an imide compound). For example, for a reason that the reactivity of the thioester-based silane coupling agent can be controlled, an imide compound represented by the following (I) can be suitably used:

Chemical Formula 10

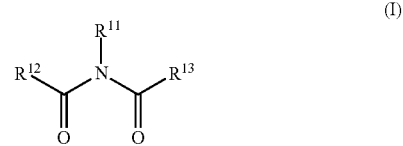

where $R^{11}$ represents a hydrogen atom, a hydroxyl group, or an organic group; and $R^{12}$ and $R^{13}$ may be the same or different and each represent a hydrogen atom or an organic group, and $R^{12}$ and $R^{13}$ may be bonded to each other to form a ring structure.

Examples of the organic group of $R^{11}$ include linear, branched, and cyclic alkyl group, aryl group, alkenyl group and the like. The organic group may have a substituent group. The number of carbon atoms of $R^{11}$ (organic group) is preferably 1-20, more preferably 1-10, and even more preferably 1-5. Examples of the alkyl group include a methyl group, an ethyl group, a propyl group, and the like; examples of the aryl group include a phenyl group, a tolyl group and the like; and examples of the alkenyl group include a vinyl group, an acryloxypropyl group and the like. The substituent group is not particularly limited, and examples of the substituent group include a hydroxyl group, a carboxyl group, a cyano group, a halogen atom, and the like. Among these, from a point of view that the effect according to an embodiment of the present invention can be satisfactorily obtained, $R^{11}$ is preferably a hydrogen atom or a hydroxyl group.

Examples of the organic group of each of $R^{12}$ and $R^{13}$ include linear, branched, and cyclic alkyl group, aryl group, alkenyl group and the like. The organic group may have a substituent group. The number of carbon atoms of each of $R^{12}$ and $R^{13}$ (organic groups) is preferably 1-20, and more preferably 1-10. When $R^{12}$ and $R^{13}$ are bonded to each other to form a ring structure, the total number of carbon atoms of $R^{12}$ and $R^{13}$ that formed the ring structure is preferably 1-30, more preferably 2-20, and even more preferably 2-12. Examples of the alkyl group, the aryl group, the alkenyl group and the substituent group are the same as those described above.

Among these, from a point of view that the effect according to an embodiment of the present invention can be satisfactorily obtained, it is preferable that $R^{12}$ and $R^{13}$ are bonded to each other to form a ring structure. Examples of bonded ring structures include a cyclopentane ring, a cyclohexane ring, a norbornene ring, and an adamantane ring, and structures in each of which a cyclopentane ring, a cyclohexane ring, a norbornene ring, an adamantane ring, a fluorene ring, a benzene ring, a naphthalene ring, a pyridine ring, a piperazine ring or the like is bonded to an imide ring.

Examples of the imide compound represented by the above formula (I) include a succinimide compound, a maleimide compound, a phthalimide compound and the like represented by the following formulas (I-1), (I-2) and (I-3). Among these, from a point of view that the effect according to an embodiment of the present invention can be satisfactorily obtained, the phthalimide compound represented by the following formula (I-3) is preferable.

Chemical Formula 11

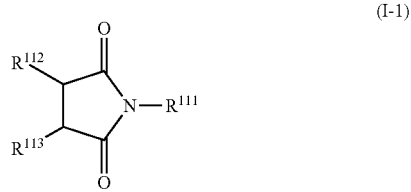

(I-1)

where $R^{111}$ represents a hydrogen atom or a hydroxyl group; and $R^{112}$ and $R^{113}$ may be the same or different and each represent a halogen atom, an alkyl group having 20 or less carbon atoms, a hydroxyl group, a hydroxymethyl group, a formyl group, a carboxyl group, an aryl group, an amino group, a cyano group or a halogen atom.

Chemical Formula 12

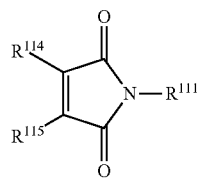

(I-2)

where $R^{111}$ represents a hydrogen atom or a hydroxyl group; and $R^{114}$ and $R^{115}$ may be the same or different and each represent a halogen atom, an alkyl group having 20 or less carbon atoms, a hydroxyl group, a hydroxymethyl group, a formyl group, a carboxyl group, an aryl group, an amino group, a cyano group or a halogen atom.

Chemical Formula 13

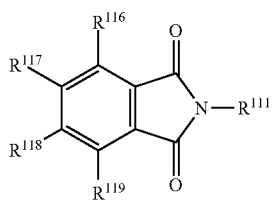

(I-3)

where $R^{111}$ represents a hydrogen atom or a hydroxyl group; and $R^{116}$, $R^{117}$, $R^{118}$ and $R^{119}$ may be the same or different and each represent a halogen atom, an alkyl group having 20 or less carbon atoms, a hydroxyl group, a hydroxymethyl group, a formyl group, a carboxyl group, an aryl group, an amino group, a cyano group or a halogen atom.

Examples of the alkyl group and the aryl group of $R^{112}$-$R^{119}$ are the same as those described above. Among these, from a point of view that the effect according to an embodiment of the present invention can be satisfactorily obtained, $R^{112}$-$R^{119}$ are preferably each a hydrogen atom or an alkyl group having 10 or less carbon atoms.

Specific examples of the imide compound include phthalimide, succinimide, maleimide; N-hydroxyphthal acid imide (N-hydroxyphthalimide), N-hydroxycohaq acid imide, N-hydroxymarain acid imide, N-hydroxyhexhydrophthal acid imide, N-hydroxytetrachlorophthal acid imide; and the like.

N-Oxyl Compound

An N-oxyl compound is a compound that can generate a nitroxyl radical. Examples of the N-oxyl compound include a compound that is represented by the following formula (II-1) and generates a heterocyclic nitroxyl radical that has an alkyl group having 1-4 carbon atoms at an α-position of an amino group.

Chemical Formula 14

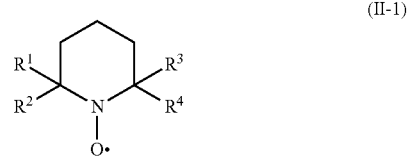

(II-1)

where $R^1$-$R^4$ may be the same or different and each represent an alkyl group having 1-4 carbon atoms.

Among compounds that each generate a nitroxyl radical represented the above formula (II-1), 2,2,6,6-tetraalkylpiperidine-1-oxyl (hereinafter also referred to as TEMPO) and its derivatives (4-hydroxy-2,2,6,6-tetraalkylpiperidine-1-oxyl, 4-alkoxy-2,2,6,6-tetraalkylpiperidine-1-oxyl, 4-benzoyloxy-2,2,6,6-tetraalkylpiperidine-1-oxyl, 4-amino-2,2,6,6-tetraalkylpiperidine-1-oxyl, and the like) can be suitably used. Among these, for a reason that good wear resistance, steering stability and processability can be obtained in a well-balanced manner, 2,2,6,6-tetramethylpiperidine-1-oxyl (hereinafter also referred to as TEMPO) and its derivatives (4-hydroxy-2,2,6,6-tetramethylpiperidine-1-oxyl (hereinafter also referred to as 4-hydroxy TEMPO), 4-alkoxy-2,2,6,6-tetramethylpiperidine-1-oxyl (hereinafter also referred to as 4-alkoxy TEMPO), 4-benzoyloxy-2,2,6,6-tetramethylpiperidine-1-oxyl (hereinafter also referred to as 4-benzoyloxy TEMPO), 4-amino-2,2,6,6-tetramethylpiperidine-1-oxyl (hereinafter also referred to as 4-amino TEMPO), and the like) are preferable, and derivatives of these can also be used.

Examples of derivatives of 4-hydroxy TEMPO include compounds represented by the following formulas (II-2)-(II-4), which are derivatives obtained by etherifying a hydroxyl group of 4-hydroxy TEMPO with an alcohol having a linear or branched carbon chain having 4 or less carbon atoms and derivatives obtained by esterifying a hydroxyl group of 4-hydroxy TEMPO with a carboxylic acid or a sulfonic acid.

Chemical Formula 15

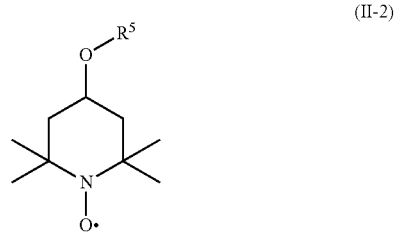

(II-2)

where $R^5$ represents a linear or branched carbon chain having 4 or less carbon atoms.

Chemical Formula 16

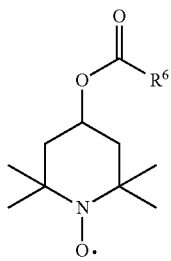

(II-3)

where $R^6$ represents a linear or branched carbon chain having 4 or less carbon atoms.

Chemical Formula 17

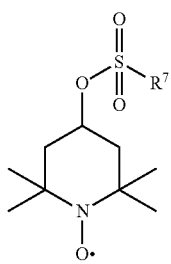

(II-4)

where $R^7$ represents a linear or branched carbon chain having 4 or less carbon atoms.

As a derivative of 4-amino TEMPO, 4-acetamido TEMPO represented by the following formula (II-5), which is obtained by acetylating an amino group of 4-amino TEMPO and is imparted with moderate hydrophobicity, is preferable in that uniformly oxidized cellulose can be obtained.

Chemical Formula 18

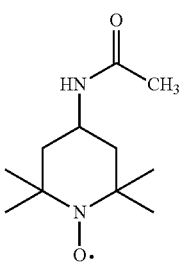

(II-5)

Further, a radical of an N-oxyl compound represented by the following formula (II-6), that is, an aza-adamantane type nitroxyl radical is also preferable in that cellulose can be efficiently oxidized in a short time.

Chemical Formula 19

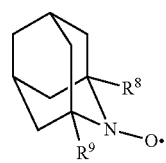

(II-6)

where $R^8$ and $R^9$ may be the same or different and each represent a hydrogen atom or a linear or branched alkyl group having 1-6 carbon atoms.

In a rubber composition obtained by using a manufacturing method according to an embodiment of the present invention, total content of the imide compound and the N-oxyl compound, with respect to 100 parts by mass of a rubber component, is preferably 0.3 parts by mass or more, more preferably 1.0 parts by mass or more, and even more preferably 1.5 parts by mass or more. When the total content of the imide compound and the N-oxyl compound is less than 0.3 parts by mass, the effect of promoting breaking of the S—C bond of the thioester-based silane coupling agent tends to be reduced. Content of the hioester-based silane coupling agent is preferably 10.0 parts by mass or less, more preferably 5.0 parts by mass or less, and even more preferably 3.5 parts by mass or less. When the content of the thioester-based silane coupling agent exceeds 10.0 parts by mass, there is a risk that processability may deteriorate. When only the imide compound or only the N-oxyl compound is included, preferred content of the imide compound or the N-oxyl compound is also the same as that described above.

Other Components

In a rubber composition obtained by using a manufacturing method according to an embodiment of the present invention, in addition to the above-described components, compounding agents used for manufacturing a rubber composition, such as a silane coupling agent other than the thioester-based silane coupling agent, oil, an anti-aging agent, a zinc oxide, a stearic acid and a vulcanization accelerator can be appropriately blended.

Next, kneading processes in a manufacturing method according to an embodiment of the present invention are described.

Base Kneading Process

In a base kneading process, a rubber component, an inorganic filler and a thioester-based silane coupling agent are kneaded. A kneading method is not particularly limited. For example, a kneading machine such as a Banbury mixer or a kneader can be used. A kneading time (kneading time of the entire base kneading process) is preferably 4-30 minutes, and a kneading temperature is preferably 130-160° C.

The rubber component, the inorganic filler and the thioester-based silane coupling agent may be either entirely charged at once or dividedly charged. However, for a reason that reaction between silica and the thioester-based silane coupling agent efficiently proceeds, it is preferable to entirely charge the rubber component, the inorganic filler and the thioester-based silane coupling agent at once.

In the base kneading process, it is sufficient to knead at least the rubber component, the inorganic filler and the thioester-based silane coupling agent. However, in addition to that, the carbon black, a stearic acid, a zinc oxide, an anti-aging agent, oil, and the like may also be kneaded. Further, the base kneading process may include one base kneading process or multiple base kneading processes.

Finishing Kneading Process

In a finishing kneading process, a kneaded material prepared by one or multiple base kneading processes, the vulcanizing agent, and at least one compound selected from a group consisting of the imide compound and the N-oxyl compound are kneaded. By adding the imide compound or the N-oxyl compound that promotes the reactivity of the thioester-based silane coupling agent in the finishing kneading process in which the vulcanizing agent is kneaded, an amount of bonding between the silane coupling agent and the polymer during vulcanization can be increased, and the elastic modulus (hardness, E*) of the rubber can be increased.

A kneading method is not particularly limited. For example, a kneading machine such as an open roll can be used. A kneading time is preferably 3-15, and a kneading temperature (discharge temperature of the kneaded material (unvulcanized rubber composition) of the finishing kneading process) is preferably 120° C. or less, and more preferably 40-115° C.

In the finishing kneading process, it is sufficient to knead at least the kneaded material obtained in the base kneading process, the vulcanizing agent, and at least one of the imide compound and the N-oxyl compound. However, in addition to that, a vulcanization accelerator and the may also be kneaded.

Other Processes

The kneaded material (unvulcanized rubber composition) obtained by the finishing kneading process is extruded according to a shape of a member such as a tread and is molded on a tire molding machine using an ordinary method, and is bonded together with other members to form a unvulcanized tire, which is then heated and pressed in a vulcanizer. Thereby, a tire can be manufactured. The manufactured tire is suitably used as a passenger car tire, a bus tire, a truck tire and the like.

Examples

Based on Examples, an embodiment of the present invention is described in detail. However, the present invention is not limited to only these Examples.

In the following, various chemicals used in Examples and Comparative Examples are described together.

SBR: Buna-VSL4720 (S—SBR; styrene content: 17.5-21.5% by mass; vinyl content: 44.5-50.5% by mass) manufactured by LANXESS Corporation Silica: Ultrasil VN3-G ($N_2SA$: 175 $m^2/g$) manufactured by EVONIK Corporation Silane coupling agent (1): Si266 (bis-(3-triethoxysilylpropyl) disulfide) manufactured by EVONIK Corporation Silane coupling agent (2): NXT silane (3-octanoylthiopropyltriethoxysilane) manufactured by Momentive Performance Materials Corporation Carbon black: Diablack I ($N_2SA$: 114 $m^2/g$; DBP: 114 ml/(100 g)) manufactured by Mitsubishi Chemical Corporation Oil: Diana Process AH-24 manufactured by Idemitsu Kosan Co., Ltd.

Zinc oxide: Zinc oxide manufactured by Mitsui Mining & Smelting Co., Ltd.

Stearic acid: Stearic Acid "Camellia" manufactured by NOF Corporation

Anti-aging agent: Ozonone 6C manufactured by Seiko Chemical Industry Co., Ltd.

Sulfur: Powdered sulfur manufactured by Tsurumi Chemical Industry Co., Ltd.

Vulcanization accelerator: Nocceler NS (N-tert-butyl-2-benzothiazolyl sulfenamide) manufactured by Ouchi Shinko Chemical Industry Co., Ltd.

Chemical 1: N-hydroxyphthalimide manufactured by Tokyo Chemical Industry Co., Ltd.

Chemical 2: Phthalimide manufactured by Sigma-Aldrich Corporation

Chemical 3: 4-hydroxy TEMPO manufactured by Tokyo Chemical Industry Co., Ltd.

Examples and Comparative Examples

Base Kneading Process

Using a 1.7 L Banbury mixer, materials described in an item of base kneading in Table 1 were kneaded to obtain a kneaded material (kneading temperature: 150° C.; kneading time: 5 minutes).

Finishing Kneading Process

Using an open roll, materials described in an item of finishing kneading in Table 1 were added to the kneaded material obtained by the base kneading process and the mixture was kneaded to obtain an unvulcanized rubber composition.

Vulcanization Process

The unvulcanized rubber composition obtained by the finishing kneading process was press-vulcanized using a mold having a thickness of 0.5 mm at 170° C. for 20 minutes, and a vulcanized rubber composition was obtained.

With respect to the obtained unvulcanized rubber composition and vulcanized rubber composition, the following evaluations were conducted. The results are shown in Table 1.

Processability Index Number (Mooney Viscosity)

Mooney viscosity of the unvulcanized rubber composition was measured at 130° C. according to JIS K6300. The result was expressed as an index number based on the following formula. A larger index number indicates a lower Mooney viscosity and a better processability.

Processability Index Number=($ML_{1+4}$ of Comparative Example 1)/($ML_{1+4}$ of each formulation)×100

Viscoelasticity Test: Complex Elastic Modulus E*

Using a viscoelasticity spectrometer VES manufactured by Iwamoto Seisakusho Co., Ltd., complex elastic modulus E* (MPa) of the vulcanized rubber composition at a temperature of 50° C. was measured under conditions of a frequency of 10 Hz, an initial strain of 10% and a dynamic strain of 2%. The result was expressed as an index number based on the following formula. A larger index number indicates a higher rigidity and a better steering stability.

E*index number=(E*of each formulation)/(E*of Comparative Example 1)×100

Wear Resistance Index Number

Using a Lambourn abrasion tester, a Lambourn abrasion amount of the vulcanized rubber composition was measured under conditions of a temperature of 20° C., a slip ratio of 20% and a test time of 2 minutes. The result was expressed as an index number based on the following formula by calculating a volume loss amount from the measured Lambourn abrasion amount. A larger index number indicates a better wear resistance.

Wear Resistance Index Number=(Volume Loss Amount of Comparative Example 1)/(Volume Loss Amount of each formulation)×100

TABLE 1

|  |  | Comparative Example | | Example | | | |
|---|---|---|---|---|---|---|---|
|  |  | 1 | 2 | 1 | 2 | 3 | 4 |
| Base kneading process | SBR | 100 | 100 | 100 | 100 | 100 | 100 |
|  | Silica | 70 | 70 | 70 | 70 | 70 | 70 |
|  | Silane coupling agent (1) (Si266) | 6 | — | — | — | — | — |
|  | Silane coupling agent (2) (NXT silane) | — | 6 | 6 | 6 | 6 | 6 |

TABLE 1-continued

|  |  | Comparative Example | | Example | | | |
|---|---|---|---|---|---|---|---|
|  |  | 1 | 2 | 1 | 2 | 3 | 4 |
|  | Carbon black | 5 | 5 | 5 | 5 | 5 | 5 |
|  | Oil | 10 | 10 | 10 | 10 | 10 | 10 |
|  | Zinc oxide | 5 | 5 | 5 | 5 | 5 | 5 |
|  | Stearic acid | 3 | 3 | 3 | 3 | 3 | 3 |
|  | Anti-aging agent | 2 | 2 | 2 | 2 | 2 | 2 |
| Finishing kneading process | Sulfur | 2 | 2 | 2 | 2 | 2 | 2 |
|  | Vulcanization accelerator | 1 | 1 | 1 | 1 | 1 | 1 |
|  | Chemical 1 (N-hydroxyphthalimide) | — | — | 2.5 | — | — | 2.5 |
|  | Chemical 2 (Phthalimide) | — | — | — | 2.5 | — | — |
|  | Chemical 3 (4-hydroxy TEMPO) | — | — | — | — | 2.5 | — |
|  | Discharge temperature of finishing kneading process | 115° C. | 115° C. | 115° C. | 115° C. | 115° C. | 120° C. |
| Evaluation | (a) Processability (target: 90 or more) | 100 | 121 | 116 | 116 | 116 | 90 |
|  | (b) E* (target: 90 or more) | 100 | 82 | 102 | 106 | 105 | 128 |
|  | (c) Wear resistance | 100 | 104 | 111 | 112 | 111 | 108 |
|  | Average index number = (a + b + c)/3 | 100 | 102 | 110 | 111 | 111 | 109 |

It is clear from Table 1 that, in Comparative Example 1 in which Si266 is used and Comparative Example 2 in which NXT silane is used, an average index number of the processability, the steering stability (E*) and the wear resistance is low, and in contrast to the poor performance balance of Comparative Examples, in Examples in which the thioester-based silane coupling agent (NXT silane) is kneaded in the base kneading process and the imide compound (N-hydroxyphthalimide, phthalimide) or the N-oxyl compound (TEMPO) was added in the finishing kneading process, the steering stability and the wear resistance are significantly improved while ensuring good processability, and the performance balance of these properties is remarkably improved. In addition, the rubber compositions of Examples were also excellent in low fuel consumption performance.

In recent years, from a standpoint of resource saving, energy saving, and the like, it is desired to improve low fuel consumption performance by reducing rolling resistance of tires for automobiles, and at the same time, improvement in performance such as durability is also demanded. As methods for reducing rolling resistance, there are adoption of a silica formulation, reduction in an amount of a filler, use of low reinforcing filler, and the like. However, there is a problem that mechanical strength or the like of a rubber is reduced and various performances deteriorate.

Further, currently, in a silica formulation, a polysulfide-based silane coupling agent or a mercapto-based silane coupling agent is used. However, depending on a kneading condition, a coupling reaction proceeds during a kneading process and processability tends to deteriorate (Japanese Patent Laid-Open Publication No. 2002-363346). Therefore, it is desired to provide a manufacturing method or the like that allows a rubber composition to be manufactured of which various rubber physical properties such as rubber strength, wear resistance and the like are improved in a well-balanced manner while good processability is obtained.

A rubber composition manufacturing method according to an embodiment of the present invention allows a rubber composition to be manufactured of which various performances such as processability, wear resistance and steering stability are improved in a well-balanced manner.

A rubber composition manufacturing method according to an embodiment of the present invention includes a base kneading process in which a rubber component, an inorganic filler and a thioester-based silane coupling agent are kneaded, and a finishing kneading process in which a vulcanizing agent and at least one compound selected from a group consisting of an imide compound and an N-oxyl compound are kneaded.

The thioester-based silane coupling agent is preferably a compound represented by the following formula (S1):

Chemical Formula 1

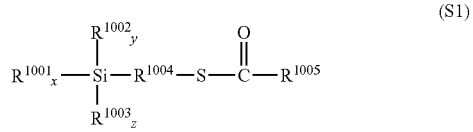

(S1)

where $R^{1001}$ is a monovalent group selected from —Cl, —Br, —OR$^{1006}$, —O (O=) CR$^{1006}$, —ON=CR$^{1006}$R$^{1007}$, —ON=CR$^{1006}$R$^{1007}$, —NR$^{1006}$R$^{1007}$ and —(OSiR$^{1006}$R$^{1007}$)$_h$(OSiR$^{1006}$R$^{1007}$R$^{1008}$) (where $R^{1006}$, $R^{1007}$ and $R^{1008}$ may be the same or different and are each a hydrogen atom or a monovalent hydrocarbon group having 1-18 carbon atoms; and h has an average value of 1-4); $R^{1002}$ is $R^{1001}$, a hydrogen atom or a monovalent hydrocarbon group having 1-18 carbon atoms; $R^{1003}$ is $R^{1001}$, $R^{1002}$, a hydrogen atom or a —[O(R$^{1009}$O)$_j$]$_{0.5}$— group (where $R^{1009}$ is an alkylene group having 1-18 carbon atoms; and j is an integer of 1-4); $R^{1004}$ is a divalent hydrocarbon group having 1-18 carbon atoms; $R^{1005}$ is a monovalent hydrocarbon group having 1-18 carbon atoms; and x, y and z are numbers satisfying the relations: x+y+2z=3, 0≤x≤3, 0≤y≤2, 0≤z≤1.

The imide compound is preferably a compound represented by the following formula (I):

Chemical Formula 2

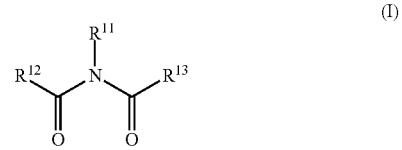

(I)

where $R^{11}$ represents a hydrogen atom, a hydroxyl group, or an organic group; and $R^{12}$ and $R^{13}$ may be the same or different and each represent a hydrogen atom or an organic group, and $R^{12}$ and $R^{13}$ may be bonded to each other to form a ring structure.

The N-oxyl compound is preferably at least one compound selected from a group consisting of compounds represented by the following formulas (II-1), (II-2), (II-3), (II-4), (II-5) and (II-6).

Chemical Formula 3

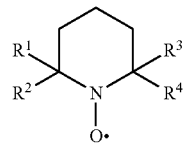

(II-1)

where $R^1$-$R^4$ may be the same or different and each represent an alkyl group having 1-4 carbon atoms.

Chemical Formula 4

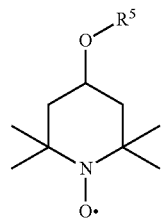

(II-2)

where $R^5$ represents a linear or branched carbon chain having 4 or less carbon atoms.

Chemical Formula 5

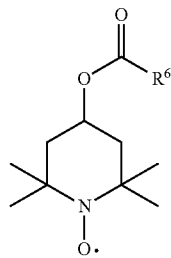

(II-3)

where $R^6$ represents a linear or branched carbon chain having 4 or less carbon atoms.

Chemical Formula 6

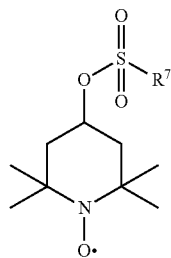

(II-4)

where $R^7$ represents a linear or branched carbon chain having 4 or less carbon atoms.

Chemical Formula 7

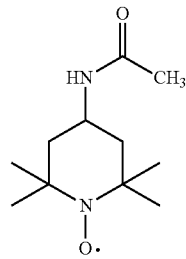

(II-5)

Chemical Formula 8

(II-6)

where $R^8$ and $R^9$ may be the same or different and each represent a hydrogen atom or a linear or branched alkyl group having 1-6 carbon atoms.

The inorganic filler is preferably silica.

A discharge temperature of the finishing kneading process is preferably 120° C. or less.

The present invention further relates to a pneumatic tire that uses a rubber composition obtained by using the manufacturing method.

According to an embodiment of the present invention, a rubber composition manufacturing method includes the base kneading process in which a rubber component, an inorganic filler and a thioester-based silane coupling agent are kneaded and the finishing kneading process in which a vulcanizing agent and at least one compound selected from a group consisting of an imide compound and an N-oxyl compound are kneaded. Therefore, a rubber composition can be manufactured of which various performances such as processability, wear resistance and steering stability are improved in a well-balanced manner.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a rubber composition, comprising:
    kneading a rubber component, an inorganic filler and a thioester-based silane coupling agent in a base kneading process such that a mixture of the rubber component, the inorganic filler, and the thioester-based silane coupling agent is obtained; and
    adding a vulcanizing agent and at least one compound selected from the group consisting of an imide compound and an N-oxyl compound to the mixture of the rubber component, the inorganic filler, and the thioester-based silane coupling agent in a finishing kneading process such that the vulcanizing agent and the imide compound and/or the N-oxyl compound are kneaded with the mixture comprising the rubber component, the inorganic filler, and the thioester-based silane coupling agent.

2. The method of claim 1, wherein the thioester-based silane coupling agent is a compound of formula (S1)

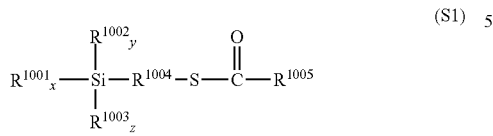

(S1)

where $R^{1001}$ is a monovalent group selected from —Cl, —Br, —OR1006, —O(O=)CR$^{1006}$, —ON=CR$^{1006}$R$^{1007}$, —ON=CR$^{1006}$R$^{1007}$, —NR$^{1006}$R$^{1007}$ and —(OSiR$^{1006}$R$^{1007}$)$_h$(OSiR$^{1006}$R$^{1007}$R$^{1008}$) where $R^{1006}$, $R^{1007}$ and $R^{1008}$ are same or different and are each a hydrogen atom or a monovalent hydrocarbon group having 1 to 18 carbon atoms, and h has an average value of 1 to 4, $R^{1002}$ is $R^{1001}$, a hydrogen atom or a monovalent hydrocarbon group having 1 to 18 carbon atoms, $R^{1003}$ is $R^{1001}$, $R^{1002}$, a hydrogen atom or a —[O(R$^{1009}$O)$_j$]$_{0.5}$— group where $R^{1009}$ is an alkylene group having 1 to 18 carbon atoms, and j is an integer of 1 to 4, $R^{1004}$ is a divalent hydrocarbon group having 1 to 18 carbon atoms, $R^{1005}$ is a monovalent hydrocarbon group having 1 to 18 carbon atoms, and x, y and z are numbers satisfying the relations, $x+y+2z=3$, $0 \leq x \leq 3$, $0 \leq y \leq 2$, $0 \leq z \leq 1$.

3. The method of claim 1, wherein the imide compound is a compound of formula (I)

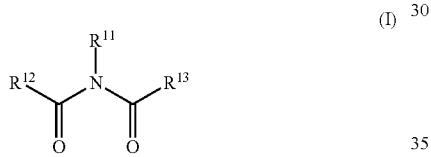

(I)

where $R^{11}$ represents a hydrogen atom, a hydroxyl group, or an organic group, $R^{12}$ and $R^{13}$ are same or different and each represent a hydrogen atom or an organic group, and $R^{12}$ and $R^{13}$ are or are not bonded to each other to form a ring structure.

4. The method of claim 1, wherein the N-oxyl compound is at least one compound selected from the group consisting of a compound of formula (II-1)

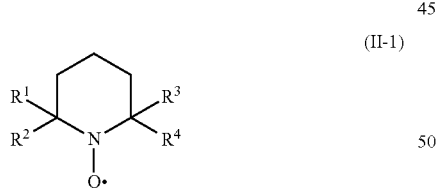

(II-1)

where $R^1$ to $R^4$ are same or different and each represent an alkyl group having 1 to 4 carbon atoms, a compound of formula (II-2)

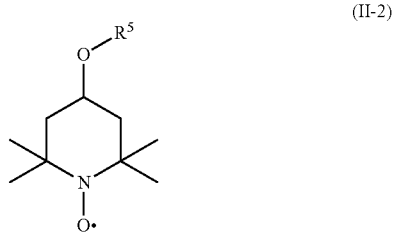

(II-2)

where $R^5$ represents a linear or branched carbon chain having 4 or less carbon atoms, a compound of formula (II-3)

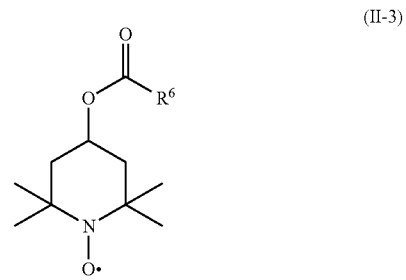

(II-3)

where $R^6$ represents a linear or branched carbon chain having 4 or less carbon atoms, a compound of formula (II-4)

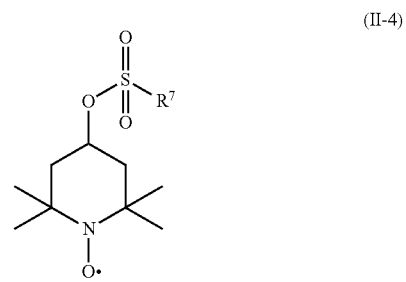

(II-4)

where $R^7$ represents a linear or branched carbon chain having 4 or less carbon atoms, a compound of formula (II-5)

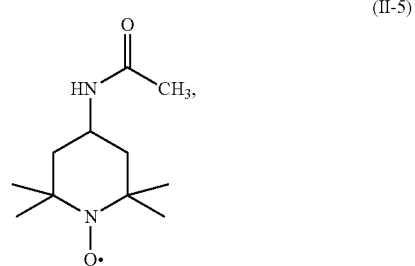

(II-5)

and a compound of formula (II-6)

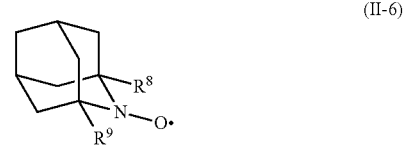

(II-6)

where $R^8$ and $R^9$ are same or different and each represent a hydrogen atom or a linear or branched alkyl group having 1 to 6 carbon atoms.

5. The method of claim 1, wherein the inorganic filler is silica.

6. The method of claim 1, wherein the vulcanizing agent and the imide compound and/or the N-oxyl compound are kneaded with the mixture comprising the rubber component, the inorganic filler, and the thioester-based silane coupling agent at a discharge temperature of 120° C. or less.

7. A pneumatic tire formed from a rubber composition obtained by the method of claim 1.

8. The method of claim 2, wherein the imide compound is a compound of formula (I)

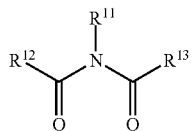

(I)

where $R^{11}$ represents a hydrogen atom, a hydroxyl group, or an organic group, $R^{12}$ and $R^{13}$ are same or different and each represent a hydrogen atom or an organic group, and $R^{12}$ and $R^{13}$ are or are not bonded to each other to form a ring structure.

9. The method of claim 2, wherein the N-oxyl compound is at least one compound selected from the group consisting of a compound of formula (II-1)

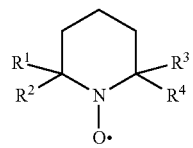

(II-1)

where $R^1$ to $R^4$ are same or different and each represent an alkyl group having 1 to 4 carbon atoms, a compound of formula (II-2)

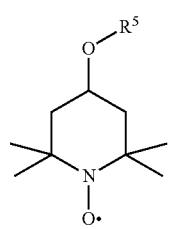

(II-2)

where $R^5$ represents a linear or branched carbon chain having 4 or less carbon atoms, a compound of formula (II-3)

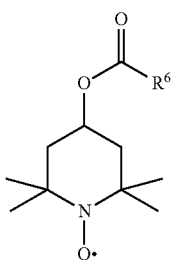

(II-3)

where $R^6$ represents a linear or branched carbon chain having 4 or less carbon atoms, a compound of formula (II-4)

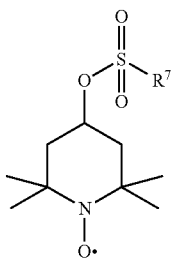

(II-4)

where $R^7$ represents a linear or branched carbon chain having 4 or less carbon atoms, a compound of formula (II-5)

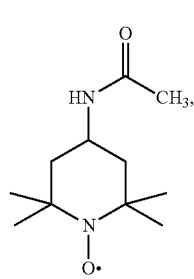

(II-5)

and a compound of formula (II-6)

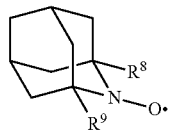

(II-6)

where $R^8$ and $R^9$ are same or different and each represent a hydrogen atom or a linear or branched alkyl group having 1 to 6 carbon atoms.

10. The method of claim 2, wherein the inorganic filler is silica.

11. The method of claim 2, wherein the vulcanizing agent and the imide compound and/or the N-oxyl compound are kneaded with the mixture comprising the rubber component, the inorganic filler, and the thioester-based silane coupling agent at a discharge temperature of 120° C. or less.

12. A pneumatic tire formed from a rubber composition obtained by the method of claim 2.

13. The method of claim 3, wherein the N-oxyl compound is at least one compound selected from the group consisting of a compound of formula (II-1)

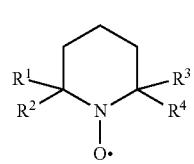

(II-1)

where $R^1$ to $R^4$ are same or different and each represent an alkyl group having 1 to 4 carbon atoms, a compound of formula (II-2)

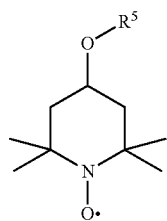
(II-2)

where $R^5$ represents a linear or branched carbon chain having 4 or less carbon atoms, a compound of formula (II-3)

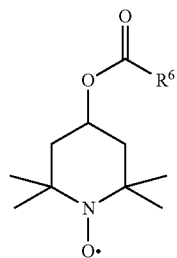
(II-3)

where $R^6$ represents a linear or branched carbon chain having 4 or less carbon atoms, a compound of formula (II-4)

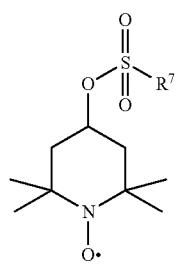
(II-4)

where $R^7$ represents a linear or branched carbon chain having 4 or less carbon atoms, a compound of formula (II-5)

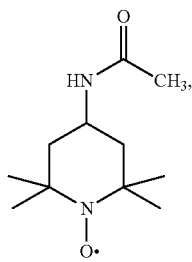
(II-5)

and a compound of formula (II-6)

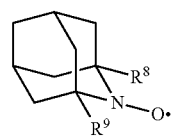
(II-6)

where $R^8$ and $R^9$ are same or different and each represent a hydrogen atom or a linear or branched alkyl group having 1 to 6 carbon atoms.

14. The method of claim 3, wherein the inorganic filler is silica.

15. The method of claim 3, wherein the vulcanizing agent and the imide compound and/or the N-oxyl compound are kneaded with the mixture comprising the rubber component, the inorganic filler, and the thioester-based silane coupling agent at a discharge temperature of 120° C. or less.

16. A pneumatic tire formed from a rubber composition obtained by the method of claim 3.

17. The method of claim 4, wherein the inorganic filler is silica.

18. The method of claim 4, wherein the vulcanizing agent and the imide compound and/or the N-oxyl compound are kneaded with the mixture comprising the rubber component, the inorganic filler, and the thioester-based silane coupling agent at a discharge temperature of 120° C. or less.

19. A pneumatic tire formed from a rubber composition obtained by the method of claim 4.

20. The method of claim 5, wherein the vulcanizing agent and the imide compound and/or the N-oxyl compound are kneaded with the mixture comprising the rubber component, the inorganic filler, and the thioester-based silane coupling agent at a discharge temperature of 120° C. or less.

* * * * *